United States Patent
Bazile et al.

(10) Patent No.: US 10,274,968 B2
(45) Date of Patent: Apr. 30, 2019

(54) METHOD AND DEVICE FOR ASSISTING WITH THE LANDING OF AN AIRCRAFT DURING A FLARE MANEUVER

(71) Applicant: Airbus Operations SAS, Toulouse (FR)

(72) Inventors: Jerome Bazile, Leguevin (FR); Matthias Eberle, Ulm (DE)

(73) Assignee: AIRBUS OPERATIONS SAS, Toulouse (FR)

(*) Notice: Subject to any disclaimer, the term of this patent is extended or adjusted under 35 U.S.C. 154(b) by 0 days.

(21) Appl. No.: 15/689,850

(22) Filed: Aug. 29, 2017

(65) Prior Publication Data
US 2018/0074515 A1    Mar. 15, 2018

(30) Foreign Application Priority Data
Sep. 14, 2016 (FR) .................................... 16 58590

(51) Int. Cl.
| G05D 1/06 | (2006.01) |
| B64C 13/00 | (2006.01) |
| G05D 1/08 | (2006.01) |
| G05D 1/00 | (2006.01) |
| G08G 5/00 | (2006.01) |
| G08G 5/02 | (2006.01) |

(52) U.S. Cl.
CPC .......... G05D 1/0676 (2013.01); G05D 1/0016 (2013.01); G05D 1/0066 (2013.01); G05D 1/0077 (2013.01); G08G 5/0021 (2013.01); G08G 5/025 (2013.01)

(58) Field of Classification Search
CPC .......... G05D 1/0016; G05D 1/06; G05D 1/08; B64D 45/0005; B64D 45/04; B64C 25/22; B64C 27/20; B64C 13/00; B64C 25/48; B64C 13/16
See application file for complete search history.

(56) References Cited

U.S. PATENT DOCUMENTS

| 2,410,855 A | * | 11/1946 | Koppen | ................. | B64C 13/00 244/213 |
| 3,659,810 A | * | 5/1972 | Robertson | ............... | B64C 13/00 244/215 |
| 4,619,110 A | * | 10/1986 | Moore | ..................... | F02C 9/28 60/39.091 |

(Continued)

FOREIGN PATENT DOCUMENTS

FR    3032044    7/2016

OTHER PUBLICATIONS

French Search Report, dated May 4, 2017, priority document.

Primary Examiner — Yuri Kan
(74) Attorney, Agent, or Firm — Greer, Burns & Crain, Ltd.

(57) ABSTRACT

A device including an acquisition module for acquiring current parameters of the aircraft, a computational module for computing a current load factor of the aircraft, a computational module for computing a minimum load factor, a computational module for computing the difference between the current load factor and the minimum load factor, and an acoustic emission module for emitting a sound signal, the level of which increases gradually as a function of time when the difference between the current load factor and the minimum load factor is less than zero.

11 Claims, 2 Drawing Sheets

(56) References Cited

U.S. PATENT DOCUMENTS

| | | | | |
|---|---|---|---|---|
| 5,170,163 | A | * | 12/1992 | Collins .................. B64D 45/04 244/187 |
| 6,158,695 | A | * | 12/2000 | Najmabadi ............. B64C 13/16 244/183 |
| 8,831,799 | B1 | | 9/2014 | Levine et al. |
| 2003/0125848 | A1 | * | 7/2003 | Otake ..................... B64C 25/48 701/3 |
| 2004/0129831 | A1 | * | 7/2004 | Dunagin, Jr. ........... B64C 27/20 244/26 |
| 2016/0214736 | A1 | * | 7/2016 | Perrin ................ B64D 45/0005 |
| 2018/0001999 | A1 | * | 1/2018 | Page ....................... B64C 25/22 |

* cited by examiner

METHOD AND DEVICE FOR ASSISTING WITH THE LANDING OF AN AIRCRAFT DURING A FLARE MANEUVER

CROSS-REFERENCES TO RELATED APPLICATIONS

This application claims the benefit of the French patent application No. 16 58590 filed on Sep. 14, 2017, the entire disclosures of which are incorporated herein by way of reference.

TECHNICAL FIELD

The present invention relates to a method and a device for assisting with the landing of an aircraft during a flare maneuver.

BACKGROUND OF THE INVENTION

During the landing of an aircraft, the pilot of the aircraft must actuate a control stick in order to perform a flare maneuver manually, this actuation having to be carried out in such a way that the impact of the aircraft with the ground occurs smoothly. The performance of this flare maneuver in complete safety requires a certain flight experience on the part of the pilot. In fact, the control stick actuation is based on visual feedback to the pilot from the environment of the aircraft, from flight parameters indicated in the cockpit, and from audible parameters such as engine noise or wind noise. The pilot's attention must therefore shift from the control instruments to the runway and vice versa, and this must take place numerous times within a reduced period.

In order to assist the pilot, HUD (Head-Up Display) devices exist which allow a maximum amount of useful information to be displayed. However, not all aircraft are equipped with devices of this type.

Devices are also known which are designed to prevent the vertical speeds of the aircraft on impact with the runway from exceeding a predetermined value, generally 8 feet per second (around 2.4 meters per second) if the pilot does not perform the flare maneuver correctly. This vertical speed limit of 8 feet per second (around 2.4 meters per second) is extremely high in relation to the customary vertical speed target of 2.5 feet per second (around 0.76 meters per second). However, this limit cannot be less, since it would make the device too intrusive into the pilot's freedom to maneuver.

It is known from document U.S. Pat. No. 8,831,799 to compute a fixed flare starting from a fixed geographical location and to guide the aircraft along the path corresponding to this flare. However, this path remains fixed until the impact of the aircraft with the landing runway. This solution obliges the pilots to follow a given path and adapt his flying technique in order to follow this path. This solution is therefore not satisfactory.

In order to assist the pilot with landing, it is also known from document FR 3032044 to use two different acoustic signals modulated as a function of the difference between a current angle of deflection of the control stick and a target angle of deflection of the control stick. However, when the control stick remains in a position for balanced flying, the aircraft does not reduce its vertical speed. The alert level remains constant since the sound signal emitted in the cockpit is a function of the difference between the current angle of deflection of the control stick and the target angle of deflection of the control stick. One possibility for overcoming this disadvantage would be to use a sound signal of which the alert level increases when the aircraft approaches the ground by keeping the angle of deflection of the control stick at a constant position. In this case, it would be possible to carry out a method based on a variable target position of the control stick which changes when the aircraft approaches the ground. However, this method would impose on the pilot a dynamic of the movement of the control stick or a point of impact with the ground which is not the point of impact intended by the pilot.

SUMMARY OF THE INVENTION

An object of the present invention is to overcome the disadvantage of the restriction of the pilot's freedom to maneuver by proposing a method for assisting with the landing of an aircraft during a flare maneuver.

For this purpose, the invention relates to a method for assisting with the landing of an aircraft during a flare maneuver, the aircraft including at least one control stick configured to be able to be actuated by a pilot in order to control the aircraft according to at least one pitch axis.

According to the invention, the method includes the following steps, implemented repetitively and automatically during a flight of the aircraft:

an acquisition step, implemented by an acquisition module, comprising acquiring a target vertical speed on impact and acquiring in real time current parameters of the aircraft, including a current vertical speed of the aircraft;

a first computational step, implemented by a first computational module, comprising computing a current load factor of the aircraft;

a second computational step, implemented by a second computational module, comprising computing a minimum load factor depending on the target vertical speed on impact and current parameters of the aircraft;

a third computational step, implemented by a third computational module, comprising computing the difference between the current load factor and the minimum load factor;

an acoustic emission step, implemented by an acoustic emission module, comprising emitting a first sound signal, the level of which increases gradually as a function of time when the difference between the current load factor and the minimum load factor is less than zero.

The emitted sound signal is a function of time and is independent from the angle of deflection of the control stick. Due to the invention, the pilot thus has the facility to maneuver the control stick as he wishes in order to perform a flare when the current load factor is less than the minimum load factor.

According to one particular feature, the acquisition step includes the acquisition of a current angle of deflection of the control stick.

Furthermore, the method includes a fourth computational step implemented by a fourth computational module, comprising computing a flare allowing the target vertical speed on impact to be attained on the basis of the current angle of deflection of the control stick and current flight parameters.

Moreover, the method furthermore includes a fifth computational step, implemented by a fifth computational module, comprising computing a difference between a current angle of deflection of the control stick and a target angle of deflection of the control stick on the basis of the difference between the current vertical speed and a reference vertical speed for the flare computed at the current position of the aircraft, the acoustic emission step comprising emitting a second sound signal, the level of which is a function of the difference between the current angle of deflection of the control stick and the target angle of deflection of the control stick, when the difference between the current load factor and the minimum load factor is strictly greater than zero.

The second computational step advantageously includes the computation by the second computational module of the minimum load factor on the basis of the following relation:

$$\Delta n_{z0} = \frac{-1}{2g\tau}(v_z + v_{z,tgt}),$$

where:
$\Delta n_{z0}$ is the minimum load factor,
g is the acceleration of gravity,
$\tau$ is a parameter for adjusting the shape of a flight path of the aircraft (AC),
$v_z$ is the current vertical speed of the aircraft,
$v_{z,tgt}$ is the target vertical speed on impact.

The reference vertical speed is furthermore computed on the basis of the following relation:

$$v_{z,cmd} = -\sqrt{v_{z,tgt}^2 + 2 \cdot g \cdot \max(\Delta n_z, \Delta n_{z0}) \cdot z}, \text{ where:}$$

$v_{z,tgt}$ is the target vertical speed on impact,
g is the acceleration of gravity,
$\Delta n_z$ is the current load factor,
$\Delta n_{z0}$ is the minimum load factor,
z is the height of the aircraft in relation to the ground.

According to one particular feature, the increase in the level of the first sound signal corresponds, on the one hand, to an increase in the sound volume and, on the other hand, to an increase in the pitch and/or an increase in a chop rate of the first sound signal.

The invention also relates to a device for assisting with the landing of an aircraft during a flare maneuver, the aircraft including at least one control stick configured to be able to be actuated by a pilot in order to control the aircraft according to at least one pitch axis.

According to the invention, the device includes:

an acquisition module configured to acquire a target vertical speed on impact and to acquire in real time current parameters of the aircraft, including a current vertical speed of the aircraft;

a first computational module configured to compute a current load factor of the aircraft;

a second computational module configured to compute a minimum load factor depending on the target vertical speed on impact and current parameters of the aircraft;

a third computational module configured to compute the difference between the current load factor and the minimum load factor;

an acoustic emission module configured to emit a first sound signal, the level of which increases gradually as a function of time when the difference between the current load factor and the minimum load factor is less than zero.

According to one particular feature, the device includes a fourth computational module configured to compute a flare allowing the target vertical speed on impact to be attained on the basis of the current angle of deflection and current flight parameters.

Moreover, the device includes a fifth computational module configured to compute a difference between a current angle of deflection of the control stick and a target angle of deflection of the control stick on the basis of the difference between the current vertical speed and a reference vertical speed for the flare computed at the current position of the aircraft.

The invention also relates to an aircraft, in particular a transport aircraft which comprises a device for assisting with the landing of an aircraft during a flare maneuver, of the type described above.

BRIEF DESCRIPTION OF THE DRAWINGS

The invention, with its characteristics and advantages, will become clearer from a reading of the description given with reference to the attached drawings, in which.

DETAILED DESCRIPTION OF THE PREFERRED EMBODIMENTS

The description that follows will make reference to the aforementioned figures.

Figure 1:
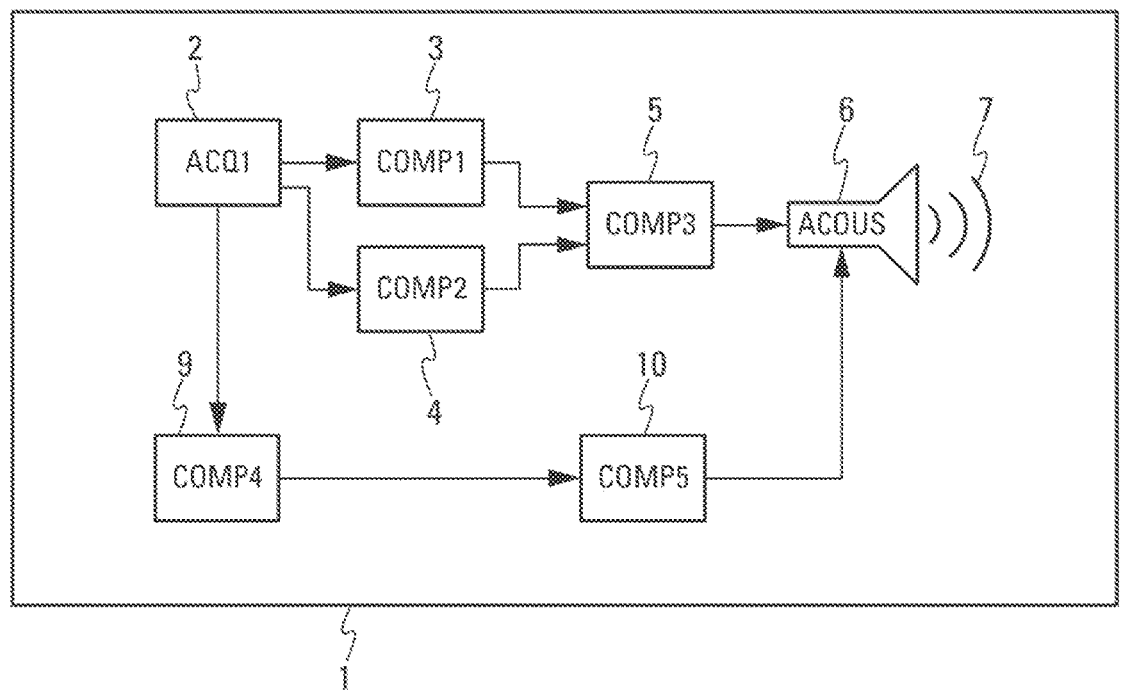
FIG. 1 shows schematically the device for assisting with the landing of an aircraft during a flare maneuver.
Figure 2:
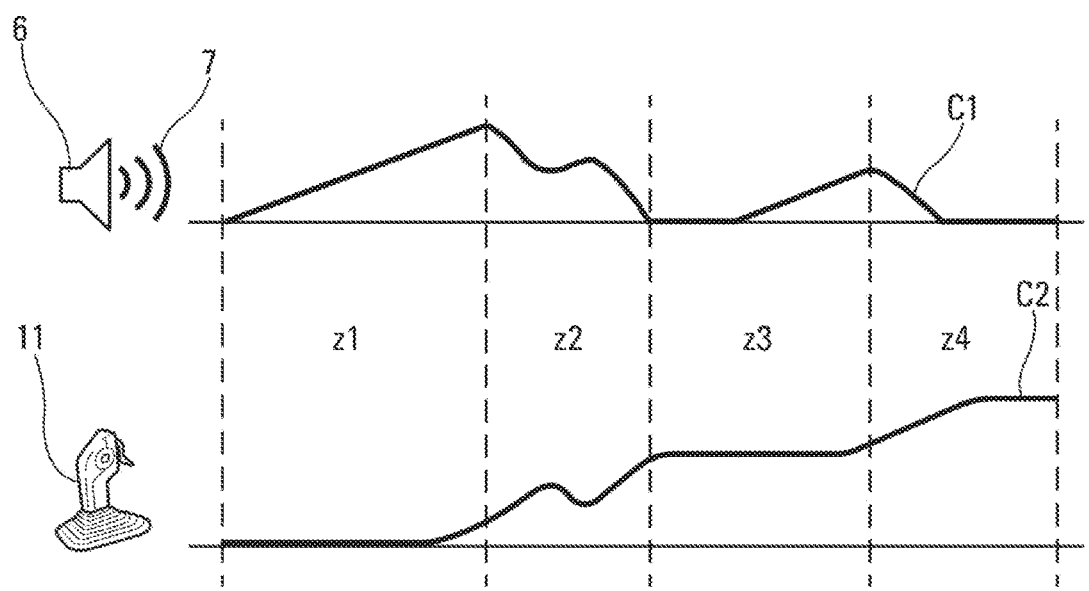
FIG. 2 shows the different sound signals emitted according to the angle of deflection of the control stick.
Figure 3:
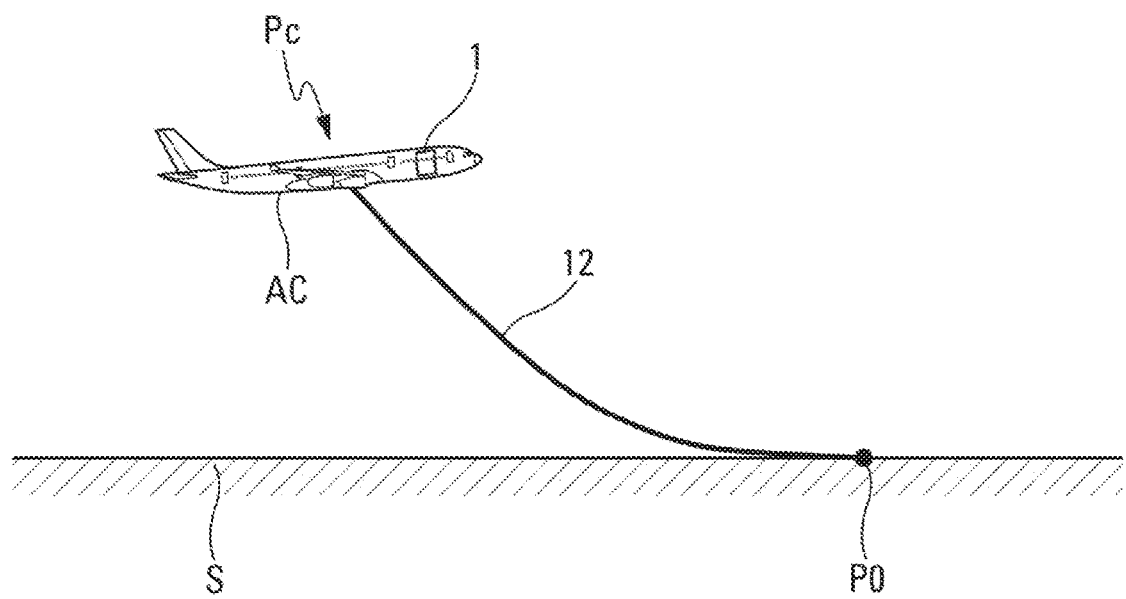
FIG. 3 shows an aircraft including the device for assisting with the landing of an aircraft during a flare maneuver in the landing phase during a flare maneuver.

FIG. 1 shows an embodiment of the device 1 for assisting with the landing of an aircraft AC during a flight maneuver 12 (FIG. 3).

The aircraft AC includes at least one control stick 11 disposed in the cockpit of the aircraft AC and configured to be able to be actuated manually by a pilot in order to control the aircraft AC according to at least one pitch axis. Conventional control units for landing in manual mode other than the control stick could be used without exceeding the scope of the invention.

According to the invention, the device 1 which is installed on-board the aircraft includes, as shown in FIG. 1:

an acquisition module ACQ1 2 configured to acquire a target vertical speed on impact (P0) and to acquire in real time current parameters of the aircraft AC, including a current vertical speed of the aircraft AC at a current position Pc of the aircraft AC (FIG. 3);

a computational module COMP1 3 configured to compute a current load factor of the aircraft AC;

a computational module COMP2 4 configured to compute a minimum load factor depending on the target vertical speed on impact P0 and current parameters of the aircraft AC at the current position Pc of the aircraft AC;

a computational module COMP3 5 configured to compute the difference between the current load factor and the minimum load factor;

an acoustic emission module ACOUS 6 configured to emit a sound signaling 7 as a function of the result of the difference between the current load factor and the minimum load factor.

The emitted sound signal thus depends on the difference between the current load factor and the minimum load factor.

The device 1 constantly acquires the current flight parameters of the aircraft AC. It also constantly computes the difference between the current load factor and the minimum load factor, for example every 40 milliseconds. The sound signal 7 emitted by the acoustic emission module 6 can then be updated constantly as a function of the difference computed by the third computational module 5.

The device 1 then allows the emission in the cockpit of the aircraft AC of a sound signal 7 as a function at least of a current load factor produced by the position of the control stick, of the height of the aircraft AC in relation to the ground S and of the vertical speed of the aircraft AC.

In one particular embodiment, the acoustic emission module 6 includes at least one loudspeaker via which the sound signal 7 is emitted in a cockpit of the aircraft AC.

As described above, the acquisition module 2 is configured to acquire the target vertical speed on impact P0. According to one variant, the acquisition module 2 allows the target vertical speed on impact P0 to be acquired automatically. According to another variant, the acquisition module 2 includes an input unit allowing the manual input by a pilot of the target vertical speed on impact P0. For example, the input unit corresponds to a touchscreen, a trackball, a physical keypad or any other input unit allowing a pilot to input the speed. In a non-limiting manner, the speed is equal to 2.5 feet per second (around 0.76 meters per second).

Furthermore, the device 1 may include a computational module COMP4 9 configured to compute a flare 12 allowing the target virtual speed $v_{z,tgt}$ on impact P0 to be computed on the basis of the current angle of deflection and current flight parameters (FIG. 3).

Furthermore, the device 1 may include a computational module COMP5 10 configured to compute a difference between a current angle of deflection of the control stick 11 and a target angle of deflection of the control stick 11 on the basis of the difference between the current vertical speed and a reference vertical speed for the flare computed at the current position of the aircraft AC.

According to the result of the difference between the current load factor and the minimum load factor, the acoustic emission module 6 emits a sound signal which is a function of the difference.

When the difference between the current load factor and the minimum load factor is less than zero, the acoustic emission module 6 emits a first sound signal, the level of which increases gradually as a function of time. Thus, when the current load factor is less than the minimum load factor, the level of the first sound signal increases gradually, independently from the angle of deflection of the control stick 11.

The first signal may occur in at least three variants. For each of these variants, the chop rate, volume and pitch change as a function of the alert level which increases as a function of time.

According to a first variant, the increase in the level of the first sound signal corresponds to an increase in the sound volume, an increase in the pitch and an increase in the chop rate.

According to a second variant, the increase in the level of the first sound signal corresponds to an increase in the sound volume and an increase in the pitch. The chop rate remains constant.

According to a third variant, the increase in the level of the first sound signal corresponds to an increase in the sound volume and an increase in the chop rate. The pitch remains constant.

According to a fourth variant, the increase in the level of the first sound signal corresponds to an increase in the pitch and an increase in the chop raped. The volume remains constant.

These variants are used to alert the pilot when the angles of deflection of the control stick 11 are insufficient, i.e., when the pilot does not level the aircraft AC sufficiently during the flare, which may cause hard landings. In this case, no acoustic feedback other than the first sound signal is emitted in the cockpit for an excessive angle of deflection in order to avoid possible long landings. This offers the advantage that the pilot has no doubt between the first sound signal and other sound signals and, consequently, with the direction of movement of the control stick 11 in stressful situations. Other variants can be envisaged to inform the pilot that the angles of deflection of the control stick 11 are insufficient.

When the difference between the current load factor and the minimum load factor is strictly greater than zero, the acoustic emission module 6 emits a second sound signal. The level of the second sound signal is a function of a difference between the current angle of deflection of the control stick 11 and a target angle of deflection of the control stick 11.

The difference between the current angle of deflection of the control stick 11 and the target angle of deflection of the control stick 11 results from the difference $\Delta\varepsilon$ between a current vertical speed $v_z$ and a reference vertical speed $v_{z,cmd}$ for the flare computed at the current position of the aircraft AC, i.e.: $\Delta\varepsilon = v_z - v_{z,cmd}$.

The minimum load factor computed by the second computational module 4 is determined in order to ensure a continuity of the alert levels between, on the one hand, a first alert level corresponding to the case where the current load factor is less than the minimum load factor and, on the other hand, a second alert level corresponding to the case where the current load factor is strictly greater than the minimum load factor.

FIG. 3 shows schematically the different alert levels. The curve C1 shows the sound level of the sound signal 7 produced by the acoustic emission module 6. The curve C2 shows the angle of deflection of the control stick 11.

The first alert level corresponds to the zones z1 and z3 of the curves C1 and C2. In these two zones z1 and z3, the sound signal 7 corresponding to the first sound signal emitted by the acoustic emission module 6 informs that the angle of deflection of the control stick 11 is insufficient. The level of the first sound signal increases gradually as a function of time, independently from the angle of deflection of the control stick 11, as long as the angle of deflection of the control stick 11 is not sufficient for the current load factor not to be strictly greater than the minimum load factor.

The second alert level corresponds to the zones z2 and z4 of the curves C1 and C2. In these two zones, the sound signal 7 corresponding to the second sound signal emitted by the acoustic emission module 6 is dependent on the angle of deflection of the control stick 11.

For the first alert level corresponding to the case where the current load factor is less than the minimum load factor, the reference vertical speed can be computed by the computational module 5 on the basis of the following relation:

$$v_{z,exp,c} = v_{z,tgt} - \frac{1}{\tau} \cdot z,$$

where:

$v_{z,tgt}$ is the target vertical speed on impact P0, $\tau$ is a predefined parameter which configures the shape of the resulting paths, z is the height of the aircraft AC in relation to the ground S.

This relation uses an exponential change model of the controlled vertical speed when the aircraft AC approaches the ground S.

For the second alert level corresponding to the case where the current load factor is strictly greater than the minimum load factor, the reference vertical speed can be computed by the computational module 9 on the basis of the following relation:

$$v_{z,cmd} = -\sqrt{v_{z,tgt}^2 + 2 \cdot g \cdot \Delta n_z \cdot z}, \text{ where:}$$

$v_{z,tgt}$ is the target vertical speed on impact P0,
g is the acceleration of gravity,
$\Delta n_z$ is the current load factor,
z is the height of the aircraft AC in relation to the ground S.

A continuity between the paths computed for the two alert levels is obtained by resolving the equation of the first alert level for the value z and by inserting it into the second equation of the second alert level for the same value of z and by assuming that $v_{z,cmd}$ and $v_{z,exp,c}$ are equal to $v_z$ and the current load factor $\Delta n_z$ is equal to the minimum load factor $\Delta n_{z0}$.

The following relation is thus obtained:

$$\frac{v_z^2 - v_{z,tgt}^2}{2 \cdot g \cdot \Delta n_{z0}} = -\tau \cdot (v_z - v_{z,tgt}).$$

On the basis of this relation, it is possible to deduce therefrom the minimum load factor by means of the computational module 4 on the basis of the following relation:

$$\Delta n_{z0} = \frac{-1}{2 \cdot g \cdot \tau}(v_z + v_{z,tgt}).$$

The reference vertical speed for the flare can then be computed by the computational module 9 on the basis of the following relation:

$$v_{z,cmd} = -\sqrt{v_{z,tgt}^2 + 2 \cdot g \cdot \max(\Delta n_z, \Delta n_{z0}) \cdot z}.$$

The function max selects the greater value between $\Delta n_z$ and $\Delta n_{z0}$. For this reason, it controls the transitions between the two alert levels. The first sound signal is thus emitted if a high probability exists of performing a hard landing when the load factor is insufficient. If not, the reference vertical speed depends on the current load factor.

The device 1 described above thus operates according to at least two alert levels.

The first alert level allows the emission of the first sound signal by the acoustic emission module 6. The first sound signal is independent from the angle of deflection of the control stick 11.

The second alert level allows the emission of the second sound signal by the acoustic emission module 6. The second sound signal depends on the angle of deflection of the control stick 11.

The transition from one alert level to another depends on the value of the current load factor. When the current load factor is less than the minimum load factor, the device 1 operates according to the first alert level. Conversely, when the current load factor is strictly greater than the minimum load factor, the device 1 operates according to the second alert level.

Figure 4:
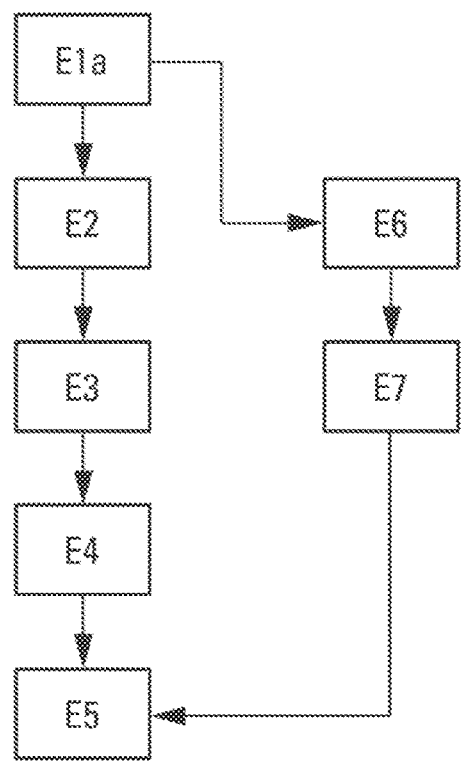
FIG. 4 corresponds to a synoptic diagram of the method for assisting with the landing of an aircraft during a flare maneuver.

The device 1 for assisting with the landing of an aircraft AC during a flare maneuver 12, as described above, implements steps of a method including the following steps (FIG. 4), implemented repetitively and automatically during a flight of the aircraft AC (FIG. 3):

an acquisition step E1a, implemented by the acquisition module 2, consisting in acquiring a target vertical speed $v_{z,tgt}$ on impact P0 and in acquiring in real time current parameters of the aircraft AC, including a current vertical speed of the aircraft AC;

a first computational step E2, implemented by the computational module 3, consisting in computing a current load factor of the aircraft AC;

a second computational step E3, implemented by the computational module 4, consisting in computing a minimum load factor depending on the target vertical speed $v_{z,tgt}$ on impact P0 and current parameters of the aircraft AC;

a third computational step E4, implemented by the computational module 5, consisting in computing the difference between the current load factor and the minimum load factor;

an acoustic emission step E5, implemented by the acoustic emission module 6, consisting in emitting a sound signal as a function of the result of the difference between the current load factor and the minimum load factor.

The acquisition step E1a may include the acquisition of a current angle of deflection of the control stick 11.

Furthermore, the method includes a fourth computational step E6 implemented by the computational module 9, consisting in computing a flare 12 allowing the target vertical speed $v_{z,tgt}$ on impact P0 to be attained on the basis of the current angle of deflection and current flight parameters.

When the difference between the current load factor and the minimum load factor is less than zero, the acoustic emission step E5 consists in emitting a first sound signal, the level of which increases gradually as a function of time.

When the difference between the current load factor and the minimum load factor is strictly greater than zero, the acoustic emission step E5 then consists in emitting a second sound signal, the level of which is a function of a difference between a current angle of deflection of the control stick 11 and a target angle of deflection of the control stick 11. The method then includes a fifth computational step E7, implemented by a fifth computational module 10, consisting in computing a difference between a current angle of deflection of the control stick 11 and a target angle of deflection of the control stick 11 on the basis of the difference between the current vertical speed and a reference vertical speed for the flare 12 computed at the current position of the aircraft AC.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assisting with a landing of an aircraft during a flare maneuver, the aircraft including at least one control stick configured to be able to be actuated by a pilot in order to control the aircraft according to at least one pitch axis, comprising the following steps, implemented repetitively and automatically during a flight of the aircraft:

acquiring a target vertical speed on impact and acquiring in real time current parameters of the aircraft, including a current vertical speed of the aircraft implemented by an acquisition module;

computing a current load factor of the aircraft implemented by a computational module;

computing a minimum load factor depending on the target vertical speed on impact and current parameters of the aircraft implemented by a second computational module;

computing a difference between the current load factor and the minimum load factor implemented by a third computational module;

emitting a first sound signal, a level of which increases gradually as a function of time when the difference between the current load factor and the minimum load factor is less than zero implemented by an acoustic emission module.

2. The method according to claim 1, wherein the step of acquiring includes acquiring a current angle of deflection of the control stick.

3. The method according to claim 2, further comprising computing a flare allowing the target vertical speed on impact to be attained based on the current angle of deflection of the control stick and current flight parameters implemented by a fourth computational module.

4. The method according to claim 2, further comprising computing a difference between a current angle of deflection of the control stick and a target angle of deflection of the control stick based on a difference between the current vertical speed and a reference vertical speed for the flare computed at a current position of the aircraft implemented by a fifth computational module, the step of emitting a first sound signal further comprising emitting a second sound signal, the level of which is a function of the difference between the current angle of deflection of the control stick and the target angle of deflection of the control stick, when the difference between the current load factor and the minimum load factor is strictly greater than zero.

5. The method according to claim 1, wherein the second computational step implemented by the second computational module includes the computation by the second computational module of the minimum load factor based on the following relation:

$$\Delta n_{z0} = \frac{-1}{2g\tau}(v_z + v_{z,tgt}),$$

where:
$\Delta n_{z0}$ is the minimum load factor,
g is acceleration due to gravity,
$\tau$ is a parameter adjusting the shape of a flight path of the aircraft (AC),
$v_z$ is the current vertical speed of the aircraft (AC),
$v_{z,tgt}$ s the target vertical speed on impact (P0).

6. The method according to claim 1, wherein a reference vertical speed for the flare is computed based on the following relation:

$$v_{z,cmd} = -\sqrt{v_{z,tgt}^2 + 2 \cdot g \cdot \max(\Delta n_z, \Delta n_{z0}) \cdot z}, \text{ where:}$$

$v_{z,tgt}$ is the target vertical speed on impact,
g is acceleration due to gravity,
$\Delta n_z$ is the current load factor,
$\Delta n_{z0}$ is the minimum load factor,
z is a height of the aircraft in relation to the ground.

7. The method according to claim 1, wherein the increase in the level of the first sound signal corresponds to at least one of an increase in the sound volume, an increase in the pitch, or an increase in a chop rate of said first sound signal.

8. A device for assisting with a landing of an aircraft during a flare maneuver, the aircraft including at least one control stick configured to be actuated by a pilot to control the aircraft according to at least one pitch axis, comprising:

an acquisition module configured to acquire a target vertical speed on impact and to acquire, in real time, current parameters of the aircraft, including a current vertical speed of the aircraft;

a first computational module configured to compute a current load factor of the aircraft;

a second computational module configured to compute a minimum load factor depending on the target vertical speed on impact and current parameters of the aircraft;

a third computational module configured to compute a difference between the current load factor and the minimum load factor;

an acoustic emission module configured to emit a first sound signal, a level of which increases gradually as a function of time when the difference between the current load factor and the minimum load factor is less than zero.

9. The device according to claim 8, further comprising a fourth computational module configured to compute a flare allowing the target vertical speed on impact to be attained based on a current angle of deflection of the control stick and current flight parameters.

10. The device according to claim 9, further comprising a fifth computational module configured to compute a difference between a current angle of deflection of the control stick and a target angle of deflection of the control stick based on the difference between current vertical speed and a reference vertical speed for the flare computed at a current position of the aircraft.

11. An aircraft comprising a device for assisting with the landing of the aircraft during a flare maneuver, as specified in claim 8.

* * * * *